March 13, 1928. 1,662,201
A. H. NIEWALD
CULTIVATOR FENDER
Filed Nov. 12, 1926 3 Sheets-Sheet 1

Inventor
A. H. Niewald

By Lacey & Lacey, Attorneys

Inventor
A. H. Niewald
By Lacey & Lacey, Attorneys

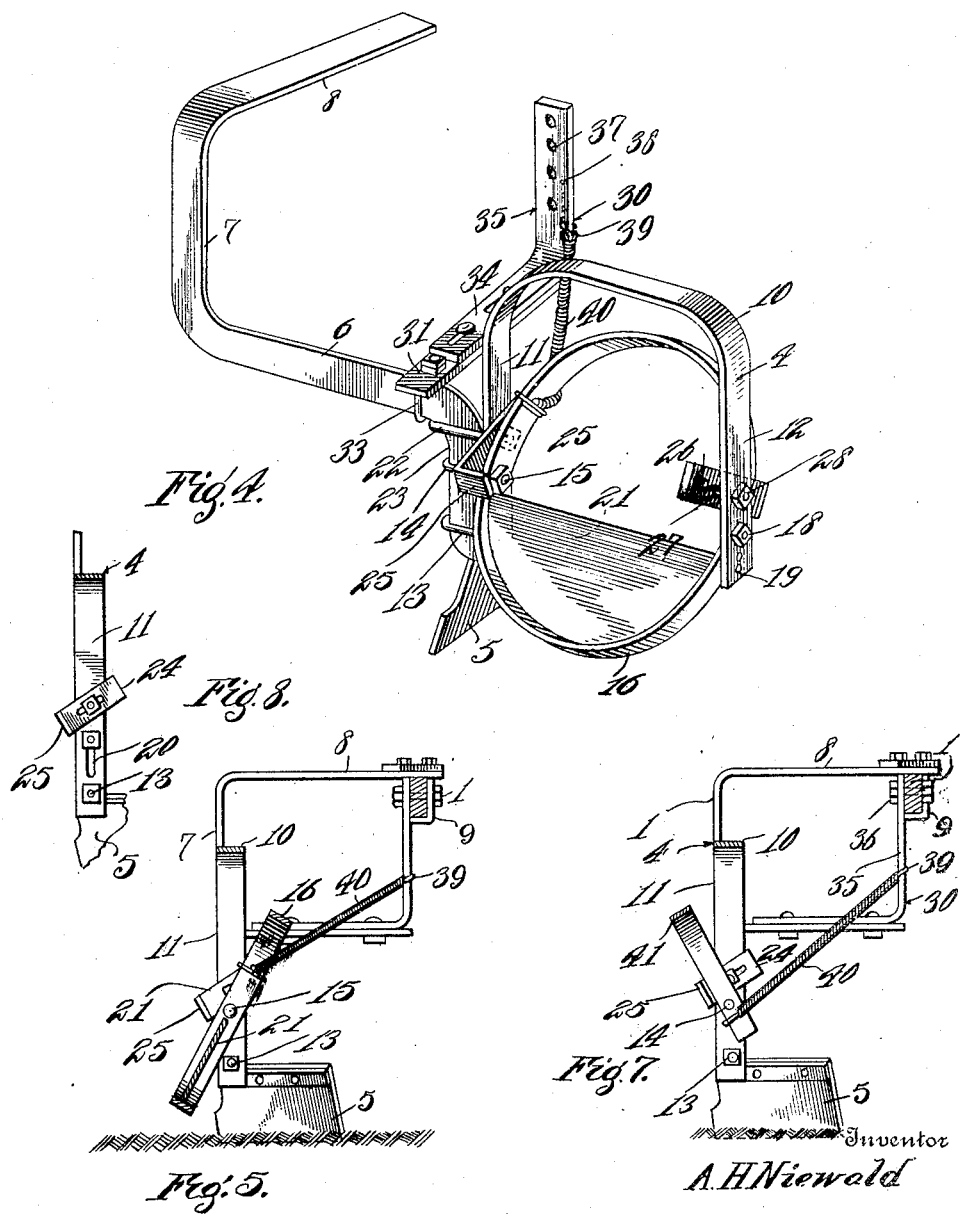

Patented Mar. 13, 1928.

1,662,201

UNITED STATES PATENT OFFICE.

AUGUST H. NIEWALD, OF FREEDOM, MISSOURI.

CULTIVATOR FENDER.

Application filed November 12, 1926. Serial No. 148,041.

The present invention is directed to improvements in a combined weed destroyer and fender, and has for its primary object to provide a device of this character so constructed that the weed cutting or destroying hoes will elevate and turn the weed bearing earth away from the plants.

Another object of the invention is to provide a device of this kind so constructed that the fenders will protect the small plants in such manner as to prevent them from being covered or broken by the earth turned by the cultivator shovel.

Another object of the invention is to provide fenders capable of yieldable adjustment for use in connection with plants of various heights.

Another object of the invention is to provide a device of this character constructed in such manner that the fenders thereof can be adjusted to bend weeds standing between comparatively tall plants downwardly in order to be effectively covered by earth turned by the cultivator shovels, the yieldable mounting of the fenders permitting the plants to pass therebetween.

Another object of the invention is to provide a device of this character so constructed that the fenders will not only protect the growing plant from being covered or broken by earth thrown up by the cultivator shovels, but can be adjusted for shielding plants of various heights.

In the accompanying drawings:

Figure 4 is a perspective view of one of the fenders removed from the cultivator.

Figure 5 is a sectional view on line 5—5 of Figure 3.

Figure 7 is a sectional view on line 7—7 of Figure 6.

Figure 8 is a sectional view on the line 8—8 of Figure 1.

Figure 1:
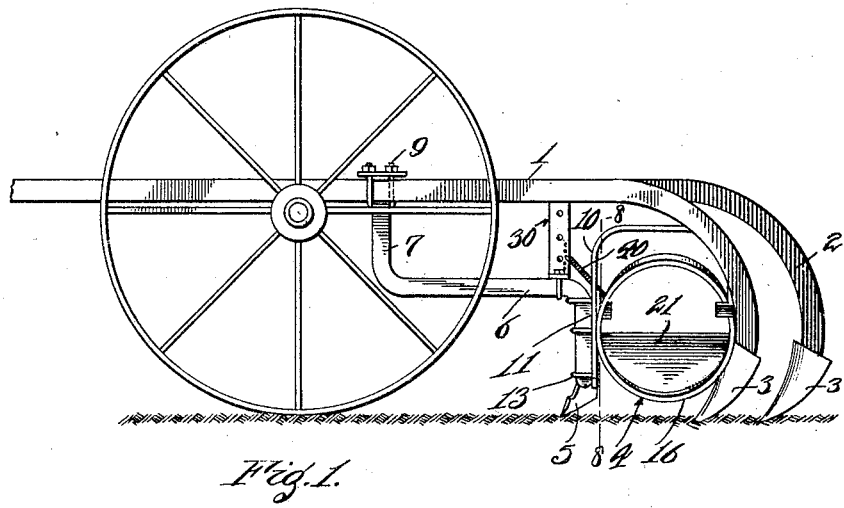
Figure 1 is a side elevation of a cultivator equipped with the fenders.

Referring to the drawings, the numeral 1 designates the spaced main beams of a straddle-row cultivator, which have attached thereto beams 2, the rear ends of which being provided with the cultivator shovels 3, as customary.

I have illustrated my invention as applied to a double gang cultivator in which instance a pair of fenders are used. It will be of course understood that cultivators having more than two gangs, each gang will have associated therewith a fender.

The fenders 4 are counterpart in construction, therefore a description of one will suffice for both, and since each fender has associated therewith a weed cutting hoe, a detail description of the hoe supporting means will now be given.

The hoe 5 is fixed to the rear end of the downturned end of the bar 6, said bar terminating at its forward end in a vertical arm 7, which in turn, terminates in a horizontal arm 8, which is secured to the respective arm 1 of the cultivator by a U-bolt 9.

The fender comprises an inverted yoke 10 formed from strap iron of suitable gage, the arms 11 and 12 of which being disposed in true parallel spaced relation. The arm 11 of the yoke carries a hook bolt 13 for clamping engagement with the rear end of the beam 6, there being a second hook-bolt 14 carried by said beam, the shank of which constitutes a pivot 15 for one side of the fender ring 16, there being a bolt 18 upon the opposite side of the ring for selectively engaging the openings 19 formed in the arm 12. The arm 11 is provided with a slot 20 in order that the bolt 14, as well as the bolt 18, can be adjusted to raise or lower the ring 16. This ring is partly closed by a semi-circular shield plate 21 which may be secured within the ring in any suitable manner.

The arm 11 carries in addition to the hook bolts 13 and 14, a similar bolt 22, the hook of which engages the beam 6, while the shank thereof extends through the slot 20 of the yoke 10, the extended end thereof being engaged in the slot 23 of the plate 24, said plate having a stop 25. A plate 26 is carried by the arm 12 of the yoke, the slot 27 thereof being engaged by the pivot bolt 28, said plate being also provided with a stop 29. It will be observed that the plates are so arranged that the respective stops thereof will be disposed upon opposite sides of the ring 16 in order that the swinging movement thereof will be limited in opposite directions, and since the plates 24 and 26 can be adjusted, the swinging movement of the ring can be conveniently regulated.

Figure 2:
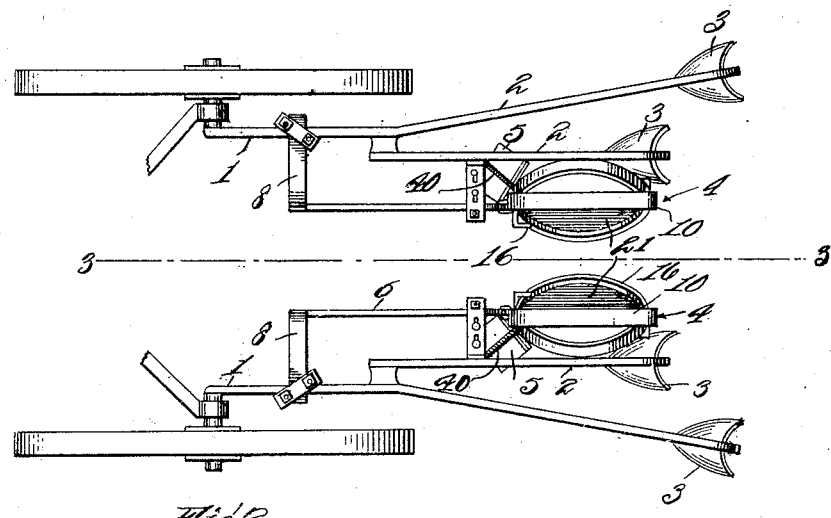
Figure 2 is a top plan view thereof.
Figure 3:
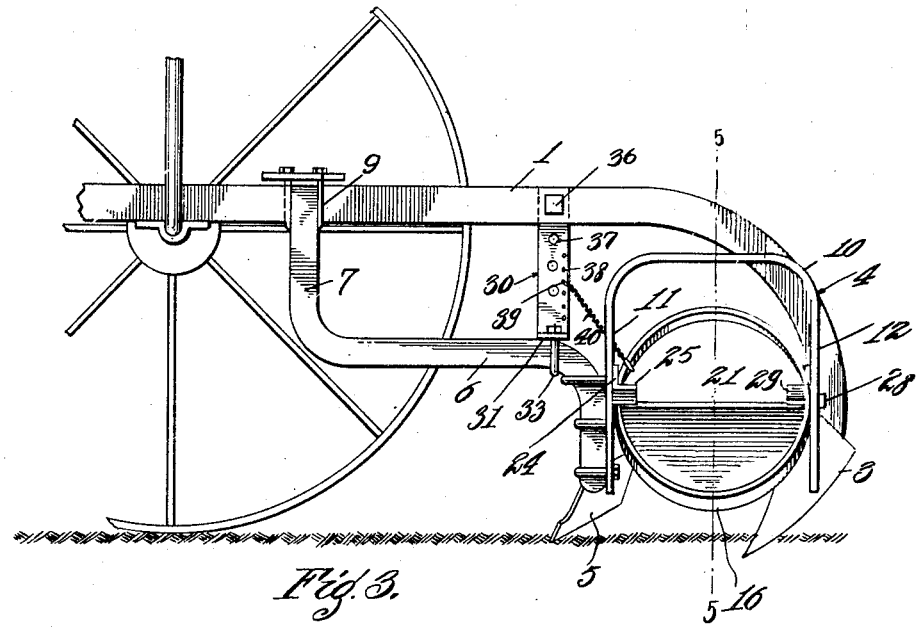
Figure 3 is a sectional view on line 3—3 of Figure 2.

In order to connect the beam 6 to one of the beams 2 of the cultivator, a bracket 30 is employed, said bracket consisting of a bar 31 and an angular member 35, the bar 31 being secured to the beam 6 by a bolt 33. The horizontal bar 34 of said member is adjustably connected to the bar 31 while the vertical bar 35 thereof carries a bolt 36 capable of selectively engaging the openings 37 of the bar 35, said bolts serving to secure the brackets to the beams 2. The bar 35 is further provided with a plurality of vertically alined perforations 38 in order that the hook 39 carried by the upper end of the coil spring 40 can be selectively engaged therein to regulate the tension of the spring. The lower end of this spring is secured to the ring 16 at a point above the pivot bolt 14 and serves to normally hold said ring engaged with the stop 29 of the plate 26, in order that its lower portion will be disposed adjacent the row of growing plants. Thus, when a straddle-row cultivator is equipped with the fenders the rings will be convergingly disposed, as more clearly shown in Figure 2 of the drawings.

Figure 6:
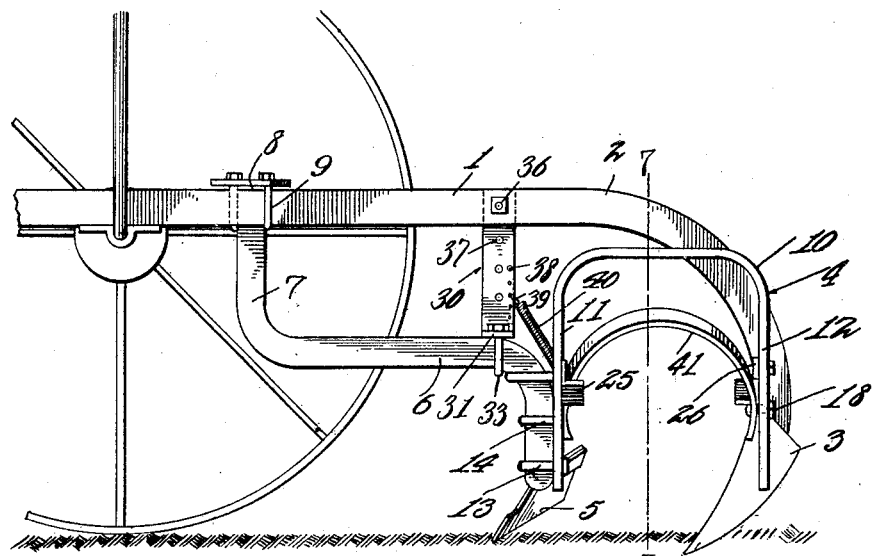
Figure 6 is a sectional side elevation of a slightly modified form.

It will be obvious that when the cultivator is drawn across a field that the fenders will be so disposed that the plants can pass between the same and the dirt turned by the shovel will be prevented from passing through the rings and falling upon the plants by the shield plate 21. Since the rings are pivotally and yieldably mounted the fenders may swing laterally when coming in contact with the plants without injuring the same. In the modified form of the invention as shown in Figures 6 and 7 of the drawings, in lieu of the ring 16 semicircular fender members 41 are used, and since these members are pivotally secured to the yoke 10 in the identical manner as the ring, a detailed description is not thought necessary. However, it will be understood that when these members are used the spring 40 has its lower terminals secured to the member below the pivot bolts 14, as more clearly shown in Figure 7 of the drawings. These members are only used when the plants are comparatively tall and serve to bend the weeds that are left standing in the rows down to the ground. The plants will slip through the yielding members while the weeds will be covered by the earth turned by the shovels 3 of the cultivator.

Having thus described the invention, I claim:

1. A fender of the class described, comprising a yoke, a ring pivotally supported by the yoke, and means for yieldably restraining the ring against swinging movement in one direction and holding the same in inclined position with respect to the yoke.

2. A fender of the class described, comprising a yoke for attachment with a cultivator, a ring pivotally supported between the arms of the yoke and stops carried by the yoke for limiting the swinging movement of the ring.

3. A fender of the class described comprising a yoke for attachment with a cultivator, a ring pivotally mounted between the arms of the yoke, plates adjustably carried by the arms of the yoke and having stops to limit the swinging movement of the ring in opposite directions.

4. A fender of the class described, comprising a yoke for attachment with a cultivator, a ring pivotally supported by the yoke, and means for yieldably sustaining the ring in an inclined position with respect to the yoke.

5. A fender of the class described, comprising a yoke, means for adjustably connecting the yoke with a cultivator, a ring pivotally supported by and between the arms of the yoke, plates adjustably carried by the arms of the yoke and having stops disposed upon opposite sides of the yoke for limiting the swinging movement of the ring in opposite directions, a shield plate carried by the ring, and yieldable means for normally holding the ring in an inclined position with respect to the yoke.

In testimony whereof I affix my signature.

AUGUST H. NIEWALD. [L. S.]